United States Patent [19]

Okamatsu et al.

[11] 4,335,337
[45] Jun. 15, 1982

[54] CONTROL SYSTEM FOR ELECTRIC MOTOR VEHICLE

[75] Inventors: Shigetoshi Okamatsu; Takashi Tsuboi; Masahiko Ibamoto; Hiroshi Narita, all of Katsuta, Japan

[73] Assignee: Hitachi, Ltd., Tokyo, Japan

[21] Appl. No.: 59,559

[22] Filed: Jul. 23, 1979

[30] Foreign Application Priority Data

Jul. 21, 1978 [JP] Japan .................. 53-88454

[51] Int. Cl.³ .............................. B61C 15/08
[52] U.S. Cl. ...................... 318/52; 318/71
[58] Field of Search .............. 318/6, 52, 71, 723

[56] References Cited

U.S. PATENT DOCUMENTS

| | | | |
|---|---|---|---|
| 3,614,564 | 10/1971 | Hirotsu et al. | 318/52 |
| 3,930,189 | 12/1975 | Smith | 318/52 |
| 3,982,164 | 9/1976 | de Buhr et al. | 318/52 |
| 4,134,048 | 1/1979 | Schneider | 318/52 |
| 4,136,303 | 1/1979 | Almquist et al. | 318/52 |
| 4,164,872 | 8/1979 | Weigl | 318/52 X |

Primary Examiner—Ulysses Weldon
Attorney, Agent, or Firm—Craig & Antonelli

[57] ABSTRACT

A control system for an electric motor vehicle adapted to be driven by a group of induction motors, comprises a converter for producing an a.c. output to energize the group of induction motors, a frequency command circuit for producing a value representing a minimum number of rotations among those of at least two induction motors of the group added with a slip frequency in a power running mode of the vehicle on one hand and a value representing a maximum number of revolutions among those of at least two given induction motors of the group subtracted by the slip frequency in a regenerative braking mode, respectively, the values being utilized as frequency control commands, and a frequency control circuit for controlling the output for controlling the output frequency of the converter in dependence on the frequency control commands, thereby to improve the adhesion performance of the electric motor vehicle.

3 Claims, 4 Drawing Figures

CONTROL SYSTEM FOR ELECTRIC MOTOR VEHICLE

BACKGROUND OF THE INVENTION

The present invention relates in general to a control system for an electric motor vehicle driven by induction motors and in particular to a control system for improving the adhesion performance of the electric motor vehicle.

In the electric motor vehicle driven by induction motors, it has been hitherto known that the speed control of the electric motor vehicle is effected by regulating the frequency of an a.c. current supplied to the induction motors. For the frequency regulation or adjustment, the varying rate of the frequency has to be selected from a range of acceleration and deceleration permissible for the induction motors so that the acceleration as well as the deceleration of the electric motor vehicle can be accomplished smoothly. To this end, a frequency control-command is produced by detecting the number of revolutions of an induction motor and adding to the detected number of revolutions a value corresponding to a slip frequency at the time when the acceleration is controlled in the power running or subtracting the same value from the detected number of revolution when the control for deceleration is to be performed in the regenerative braking mode. When the control command thus prepared is utilized for the speed control, the frequency of the a.c. current supplied to the given induction motor is prevented from being increased (in the power running mode) or decreased (in the regenerative braking mode) independently from the number of revolutions of the induction motor. As a consequence, the electric motor vehicle can be controlled smoothly in respect of acceleration and deceleration. However, in the event that the wheels driven by the given induction motor undergo slipping (in the power running mode) or sliding (in the regenerative braking mode), the frequency of the a.c. current supplied to the induction motor will be increased (in the case of wheel slip) or decreased (in the case of wheel slide) following wheel slip or slide, resulting in the disadvantages promotion of wheel slip or slide.

A system for driving an electric motor vehicle by means of the induction motors is reported in a literature "ZEV-Glas. Ano. 101" (1977), Nr. 8/9, August/September, page 363 to 370, for example. However, this prior art neither teaches nor suggests any means for improving the adhesion characteristic or performance of the electric motor vehicle.

SUMMARY OF THE INVENTION

An object of the present invention is to provide a control system for an electric motor vehicle of an induction motor drive type having an improved adhesion performance.

In view of the above and other objects which will become more apparent as description proceeds, there is proposed according to an aspect of the invention a control system for an electric motor vehicle adapted to be driven by a plurality of induction motors in which the number of revolutions of at least two induction motors are detected and a frequency control command is prepared either from a value obtained by adding a slip frequency to the minimum number of revolution among those detected in the power running mode or a value obtained by subtracting the slip frequency from the maximum number of revolutions in the regenerative braking mode. The frequency control command thus derived is then utilized for controlling the frequency of a.c. current applied to the induction motors, whereby the adhesion performance or characteristic of the electric motor vehicle is significantly improved.

DESCRIPTION OF THE PREFERRED EMBODIMENTS

Figure 1:
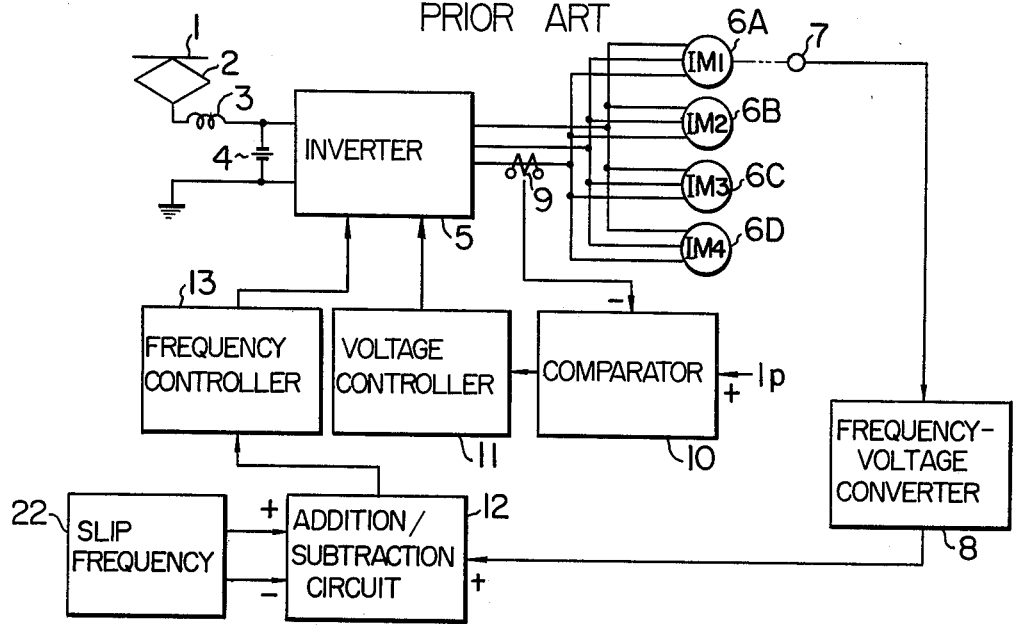
FIG. 1 is a schematic circuit diagram showing a typical example of hitherto known control systems for driving an electric motor vehicle by means of induction motors.

FIG. 1 shows schematically a circuit arrangement of a hitherto known control system for an electric motor vehicle driven by induction motors.

In the figure, reference numeral 1 denotes a d.c. overhead line, 2 denotes a pantograph, 3 denotes a filter reactor, 4 denotes a filter capacitor, 5 denotes an inverter, 6A to 6D denote induction motors, respectively, 7 denotes a pulse generator, 8 denotes a frequency-to-voltage converter (hereinafter referred to as F-V converter), 9 denotes a current detector, 10 denotes a comparator, 11 denotes a voltage controller, 12 denotes an addition/subtraction circuit, and numeral 13 designates a frequency controller. The pulse generator 7, the F-V converter 8, the addition/subtraction circuit 12 and the frequency controller 13 cooperate to constitute a frequency control loop. The addition/subtraction circuit 12 is so arranged that a signal value representative of a slip frequency 22 is added to the output voltage signal from the F-V converter 8 in the power running mode, while in the regenerative braking mode, the signal representative of the slip frequency is subtracted from the output signal of the F-V converter 8, thereby to produce a frequency control command, respectively. The slip frequency 22 is predetermined to have a value corresponding to a desired slip of the induction motors during their operations. The frequency controller 13 responds to the frequency command for controlling the output frequency from the inverter 5 in accordance with the frequency command. Through the frequency control system of the above arrangement, the revolution number of the induction motors 6A to 6D is controlled to effect acceleration or deceleration of the electric motor vehicle.

On the other hand, the current detector 9, the comparator 10 and the voltage control apparatus 11 constitute a current control loop which serves to control the output voltage of the inverter 5 so that the output current from the inverter 5 becomes equal to a command current $I_p$. A constant current control performed through such current control loop is a typical example of a constant torque control for assuring a comfortable ride in the electric motor vehicle. As another example of the constant torque control the constant current control may be replaced by a voltage-frequency proportional control in which the output voltage from the inverter 5 is varied in proportion to the output frequency thereof.

With the arrangement of the control system described above, the frequency control for the induction motors 6A to 6D can be effected normally to assure a smooth acceleration or deceleration of the electric motor vehicle, so far as the wheels driven by the induction motor 6A undergo neither slipping nor sliding. However, when slipping or sliding takes place in the wheel driven by the induction motor 6A, the frequency of the control command will be increased or decreased so as to follow the wheel slip or slide, resulting in further promotion of the wheel slip or slide, thereby making eventually impossible the smooth control for acceleration or deceleration of the electric motor vehicle. Since the normal and proper control for acceleration and deceleration of the motor vehicle can be attained in a satisfactory manner only in the state in which the wheels of the vehicle are adhering to the rails, a control system is required which exhibits an improved adhesion performance or characteristic which prevents positively the occurrence of the wheel slip or slide or at least causes the wheels to resume adhesion to the rails immediately when the wheel slip or slide occurs.

In this respect, the control system reviewed above by the referring to FIG. 1 is poor in the adhesion performance because the wheel slip or slide once produced tends to be promoted.

With the present invention, it is contemplated to enhance the adhesion performance described above.

Figure 2:
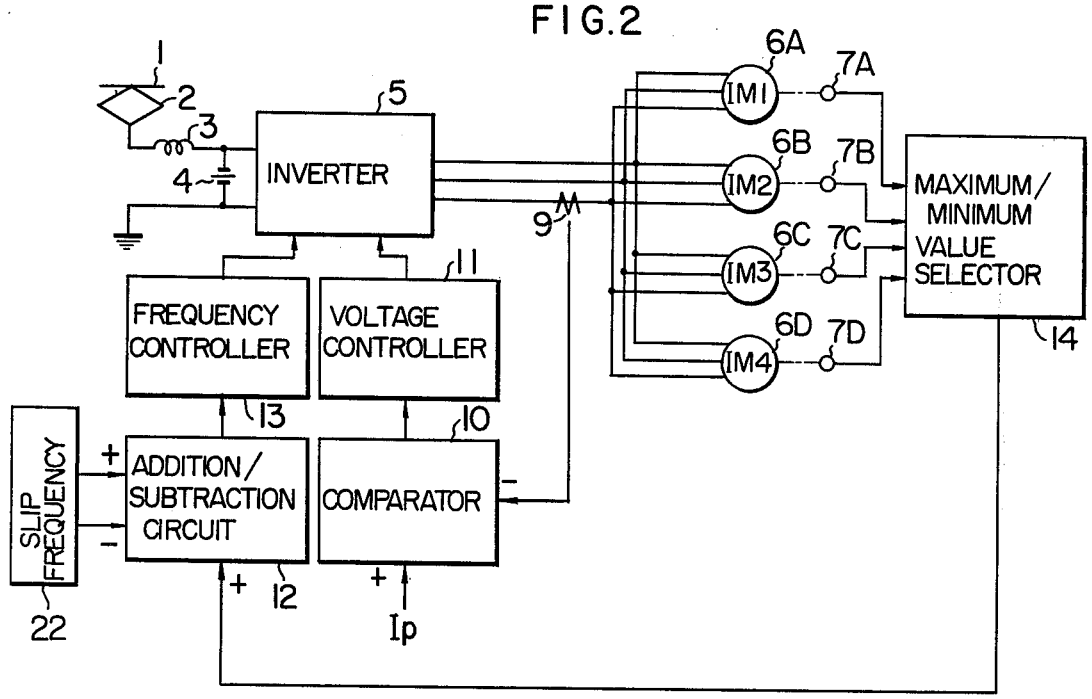
FIG. 2 is a schematic circuit diagram showing a control system for an electric motor vehicle of an induction motor drive type according to the invention.

FIG. 2 shows in a schematic circuit diagram the control system according to the invention which differs from the one shown in FIG. 1 in that a maximum value and minimum value selecting circuit 14 is provided in place of the F-V converter 8 and that the induction motors 6A to 6D are provided with the pulse generators 7A to 7D, respectively, the output from these pulse generators 7A to 7D being applied to the inputs of the selecting circuit 14. It should be mentioned that the selecting circuit 14 is adapted to respond to a power running command or a regenerative braking command from a command unit (not shown) thereby to select the output signal representing the lowest or minimum number of revolutions among those from the pulse generators 7A to 7D in the case of the power running mode and select the highest or maximum number of revolutions in the regenerative braking mode, whereby the selected frequency is converted into a corresponding voltage which is then produced as the control output signal.

By virtue of the arrangement of the control system described above, so far as any one of the wheels driven by the induction motors 6A to 6D remains adhered to the rail, the frequency of the control command is prevented from being increased nor decreased so as to follow the slip or slide which may occur in the other wheels, because the slipping takes place only in the power running mode and acts to increase the rotation of the wheel and therefore the number of revolutions of the wheel under slipping is never picked up by the selecting circuit 14 due to the fact that the minimum number of revolutions is selected by the selecting circuit in the power running mode. For the similar reason, the sliding takes place in the regenerative braking mode and acts to decrease the rotation of the wheel and therefore the system will not involve slaved decreased in the frequency of the control command because of the maximum number of revolutions being selected by the selecting circuit 14 in the case of the regenerative braking operation. By preventing the frequency of the control command from increasing or decreasing with occurrence of slipping or sliding at any wheel, the slip frequency of the induction motor driving the wheel being subjected to the slipping or sliding will be automatically decreased, resulting in correspondingly reducing the torque generated by the induction motor, i.e. the drive torque in the power running mode or the braking torque in the regenerative braking mode, whereby the wheel is caused to adhere again to the associated rails.

It will thus be appreciated that the control system shown in FIG. 2 allows re-establishment of the sticking or adhesion state of the wheels in a facilitated manner so long as at least one wheel remains adhesion to the rail even when all the other wheels undergo slipping or sliding. In other words, the adhesion characteristic or performance of the electric motor vehicle is thus improved significantly.

Figure 3:
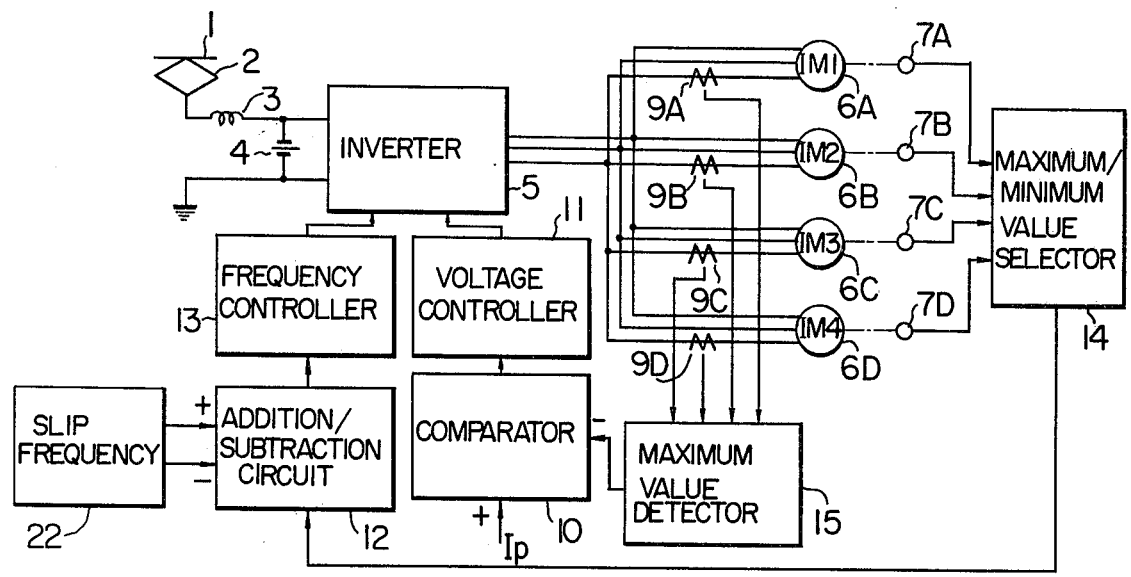
FIGS. 3 and 4 show other control systems according to the invention.

FIG. 3 shows another control system according to the invention which is different from the one shown in FIG. 2 in that the currents flowing through the induction motors 6A to 6D are separately and independently detected, and that the maximum one among the detected currents is selected by a maximum value detector 15, whereby the output voltage of the inverter 5 is controlled such that the maximum current becomes equal to the command current $I_p$.

Through the so-called maximum current constant control described above, the adhesion performance is further improved over the adhesion characteristic attainable through the total current constant control described hereinbefore in conjunction with FIG. 2. This can be explained as follows. If any given one of the wheels is subjected to slipping, the current flowing through the induction motor driving the given wheel tends to be decreased. However, such tendency is prevented by operation of the total current constant control system, so that the driving torque produced by the induction motor driving the wheel being subjected to slipping can not be decreased, whereby the restoration of the adhesion state will be delayed state. In contrast thereto, the maximum current constant control provides no obstacle to the tendency of decreasing the current in the induction motor associated with the slipping wheel. Thus, the driving torque of the induction motor is allowed to decrease, thereby to instantly re-establish the adhesion state. In this way, the control system shown in FIG. 3 can exhibit greatly improved adhesion performance over that of the control system shown in FIG. 2.

Figure 4:
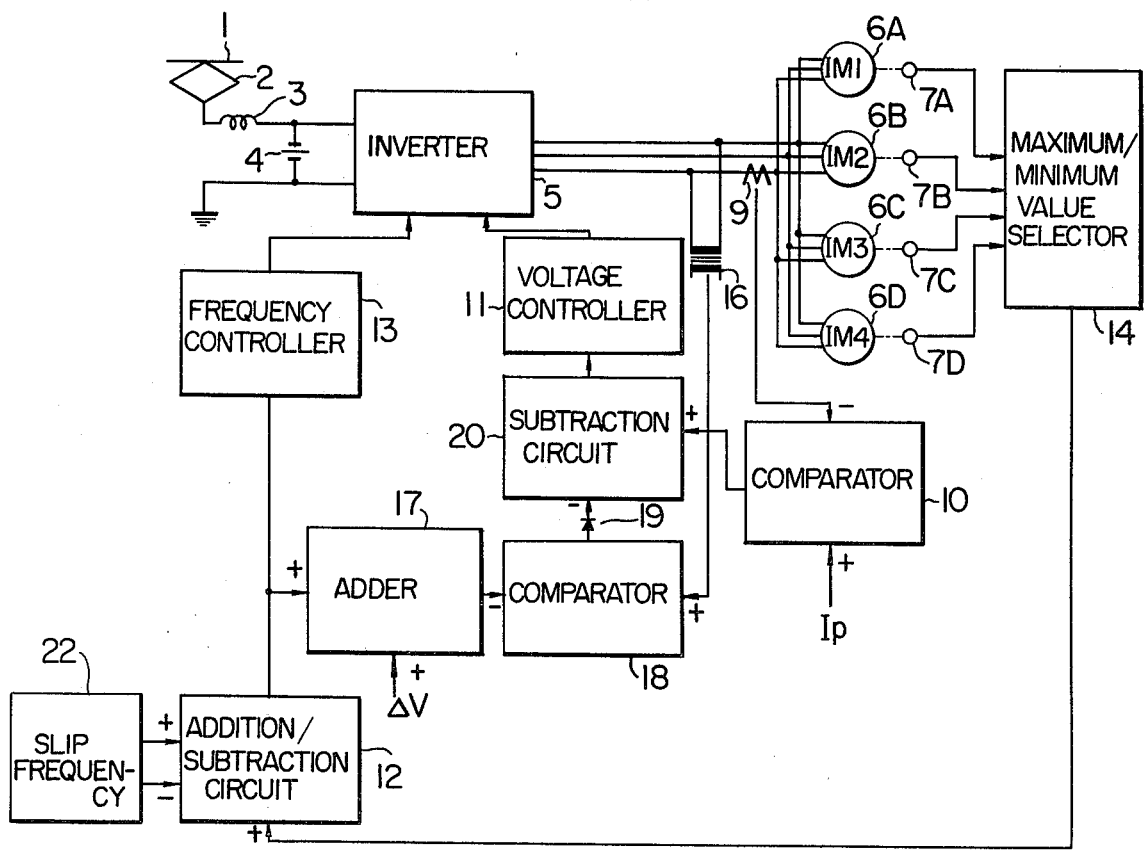

FIG. 4 shows still another control system according to the invention, which differs from the one shown in FIG. 2 in that a voltage limiter circuit is provided which is composed of a voltage detector 16, an adder 17, a comparator 18, a diode 19 and a subtraction circuit 20. The adder circuit 17 functions to add a preset voltage to a voltage proportional to the output frequency from the inverter 5 (which is equivalent to the frequency command from the addition/subtraction circuit 12) thereby to produce a voltage limit value for the purpose described below. In this connection, it will be recalled that the constant torque control can be accomplished by the voltage frequency proportional control, as well as the constant current control. With the voltage-frequency proportional control, the voltage and frequency supplied to an induction motor are controlled to be in a predetermined proportional relationship, thereby to control the torque produced by the induction motor to be at a constant level. This means that deviation of the relation between the voltage and the frequency from the predetermined proportional relationship will represent an abnormality occurring in the constant torque control. In this manner, the value obtained by adding the preset voltage ΔV to the voltage proportional to the frequency of the control command can be utilized as the limit or reference voltage for the output control signal for the constant torque control. The comparator 18 serves to compare the output signals from the adder 17 and the voltage detector 17 with each other, thereby to turn on the diode 19 when the output level from the voltage detector 16 is higher than that of the adder 17. On the other hand, the subtraction circuit 20 serves to subtract the positive signal component produced at the output of the comparator 18 from the command signal voltage supplied to the voltage controller 11 from the comparator 10.

With the arrangement of the control system described above, when the current flowing through any given induction motor decreases due to slipping of the associated driven wheels thereby to trigger the operation of the constant current control loop, any increasing in the output voltage from the inverter 5 is limited within a predetermined range. Consequently, the drive torque generated by the induction motor associated with the wheel undergoing slipping is reduced to a level at which the adhesion state can be easily restored. Additionally, because the output voltage is allowed to be increased within the predetermined limit, the driving torque of the other induction motors can be increased within a range in which the wheel slip is not promoted, whereby the decrease in the whole driving torque can be compensated to some degree.

In the foregoing description, it has been assumed that four induction motors are employed for driving the electric motor vehicle. However, it will be appreciated that the invention can be applied with the same effects to a vehicle driven by any plural number of induction motors.

Further, the embodiments of the invention have been described on the assumption that the number of revolutions are detected for all the induction motors. However, the invention is never restricted to such arrangement. Requirement resides only in that the number of revolutions of at least two induction motors be detected. In this case, unless the two wheels undergo slipping or sliding simultaneously, a normal operation of the electric motor vehicle can be assured. For the similar reason, it is not always necessary to detect the currents flowing through all the induction motors even in the case of the maximum current constant control system described hereinbefore referring to FIG. 3.

In the embodiments described, a converter is used to convert a d.c. current into a a.c. current of variable voltage and frequency. However, it should be appreciated that so far as such an a.c. current of variable voltage and frequency is available, any type of power supply source can be used. Further, the d.c. power may be supplied through an overhead line from an external power source or directly from a battery mounted on the vehicle. Further, the converter is not necessarily constituted by the inverter. In the case of a d.c. current supply source, an inverter or a combination of the inverter and a chopper may be used. For an a.c. current supply source, a cycloconverter or a combination of a cycloconverter and an inverter may be adopted.

It will be now appreciated that the invention has proposed a control system for an electric motor vehicle of an induction motor drive type which can exhibit an improved adhesion performance.

We claim:

1. A control system for a vehicle driven by a plurality of induction motors, said system comprising: a power converter for producing and supplying to said induction motors a three-phase a.c. electric power of variable frequency and variable voltage; means for detecting individually the rotation speeds of at least two of said induction motors; means for selecting the minimum one or maximum one of the rotation speeds detected by said detecting means depending on whether the vehicle is in the power running mode or the regenerative braking mode, respectively; means for setting a slip frequency signal representing a predetermined slip frequency to be applied to said induction motors; adding/subtracting means for adding to said selected minimum rotation speed or subtracting from said selected maximum rotation speed to said slip frequency; frequency control means for controlling said power converter so as to cause said three-phase a.c. electric power produced by said power converter to have a frequency corresponding to the output of said adding/subtracting means, means for presetting a current command for current supplied to said induction motors, means for detecting current supplied to said induction motors, means for comparing the current represented by said preset current command with the current detected by said detecting means thereby to produce a current difference therebetween, and means for controlling the output voltage of said power converter according to said current difference, wherein said current detecting means comprises means for detecting individual currents supplied to said induction motors, respectively, and means for selecting a maximum one of said detected individual currents.

2. A control system for a vehicle driven by a plurality of induction motors, said system comprising: a power converter for producing and supplying to said induction motors a three-phase a.c. electric power of variable frequency and variable voltage; means for detecting individually the rotation speeds of at least two of said induction motors; means for selecting the minimum one or maximum one of the rotation speeds detected by said detecting means depending on whether the vehicle is in the power running mode or the regenerative braking mode, respectively; means for setting a slip frequency signal representing a predetermined slip frequency to be applied to said induction motors; adding/subtracting means for adding to said selected minimum rotation speed or subtracting from said selected maximum rotation speed the said slip frequency signal; frequency control means for controlling said power converter so as to cause said three-phase a.c. electric power produced by said power converter to have a frequency corresponding to the output of said adding/subtracting means; and means for limiting the output voltage of said power converter, including first means connected to the output of said adding/subtracting means for producing a voltage proportional to the output frequency of said power converter and second means connected to said power converter and to said first means for preventing the output voltage of said power converter from exceeding said voltage proportional to the output frequency of said power converter by more than a predetermined voltage.

3. A control system for a vehicle driven by a plurality of induction motors, said system comprising: a power converter for producing and supplying to said induction motors a three-phase a.c. electric power of variable frequency and variable voltage; means for detecting individually the rotation speeds of at least two of said induction motors; means for selecting the minimum one or maximum one of the rotation speeds detected by said detecting means depending on whether the vehicle is in the power running mode or the regenerative braking mode, respectively; means for setting a slip frequency signal representing a predetermined slip frequency to be applied to said induction motors; adding/subtracting means for adding to said selected minimum rotation speed or subtracting from said selected maximum rotation speed the said slip frequency signal; frequency control means for controlling said power converter so as to cause said three-phase a.c. electric power produced by said power converter to have a frequency corresponding to the output of said adding/subtracting means; means for presetting a current command for current supplied to said induction motors; means for detecting current supplied to said induction motors; means for comparing the current represented by said preset current command with the current detected by said detecting means thereby to produce a current difference therebetween; means for controlling the output voltage of said power converter according to said current difference; first means connected to the output of said adding/subtracting means for producing a voltage proportional to the output frequency of said power converter and second means connected to said power converter, said first means and said output voltage control means for controlling said output voltage control means so as to prevent the output voltage of said power converter from exceeding a voltage proportional to the output frequency of said power converter by more than a predetermined voltage.

* * * * *